Patented May 1, 1934

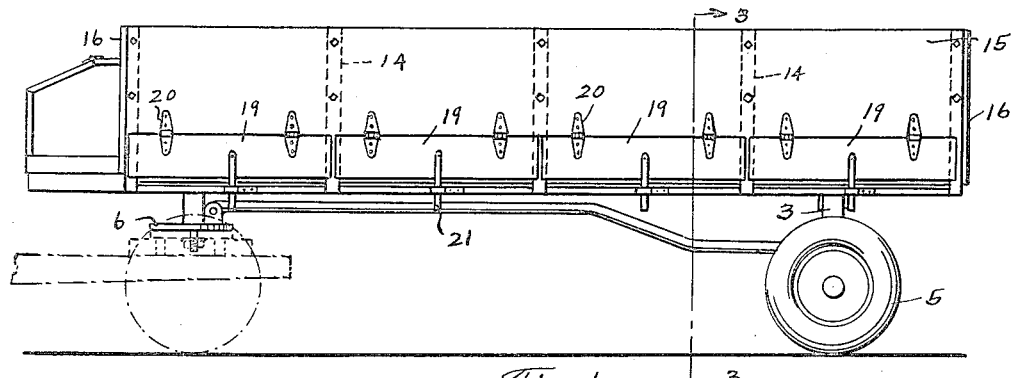
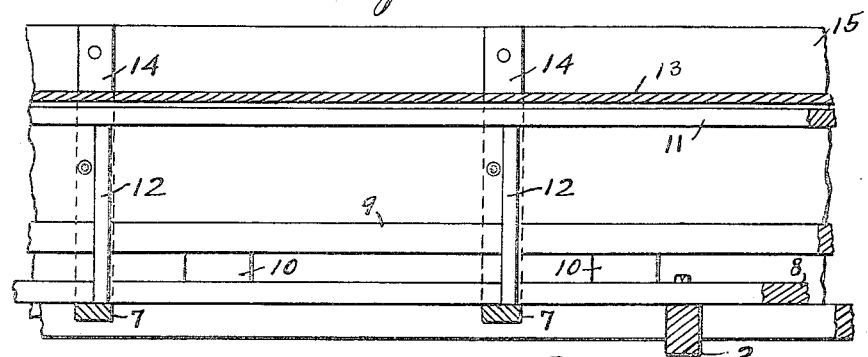
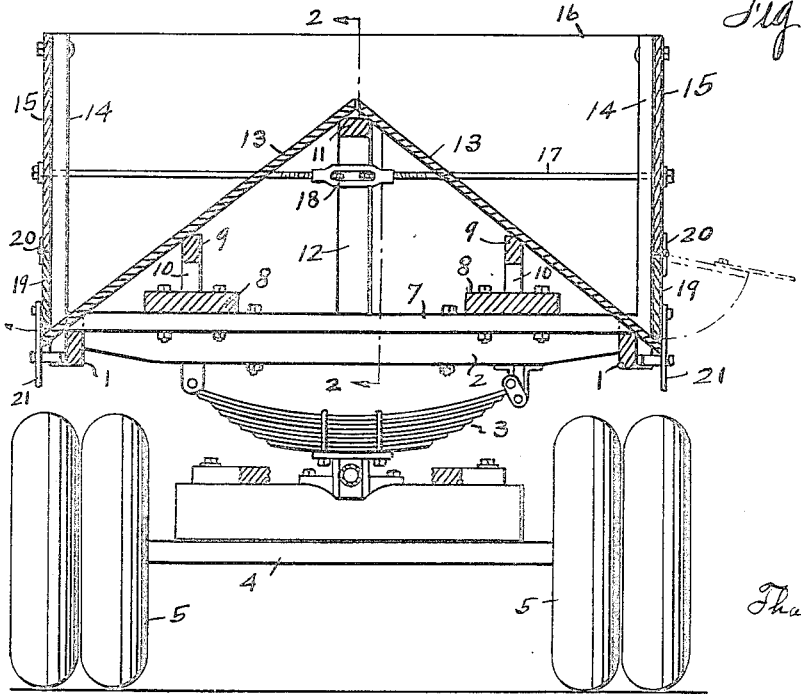

1,956,994

UNITED STATES PATENT OFFICE 1,956,994

LOAD CARRYING VEHICLE

Thaddeus Parsons, Galveston, Tex.

Application April 7, 1933, Serial No. 664,895

1 Claim. (Cl. 298—24)

This invention relates to a load carrying vehicle.

An object of the invention is to provide a vehicle, preferably of the trailer type, having a body for carrying loads of aggregate, such as gravel and similar materials and equipped with means to facilitate unloading.

Another object is to provide, in a vehicle, a body having outwardly opening side doors and a bottom so inclined that upon opening the doors the load will be discharged by gravity.

Another object is to provide a special type of vehicle body construction.

With the above and other objects in view this invention has particular relation to certain novel features of construction, operation and arrangement of parts an example of which is given in this specification and illustrated in the accompanying drawing, wherein:—

Figure 1 shows a side view of the vehicle.

Figure 2 shows a fragmentary longitudinal sectional view taken on the line 2—2 of Figure 3, and Figure 3 shows a cross sectional view taken on the line 3—3 of Figure 1.

In the drawing the numerals 1, 1, designate the side members of the vehicle framework, or chassis, which are connected by the front and rear cross beams 2, 2.

The rear beam is supported on the leaf spring 3 which, in turn, is mounted on the rear axle 4 supported by the ground wheels 5. The forward end of the framework has the depending upper turntable 6 which is pivotally supported on a lower turntable on the rear end of the truck, or tractor.

On the side members 1, 1, are the spaced cross bars 7 on which are mounted the lengthwise plates 8, 8 which are bolted to said cross bars and which are located on opposite sides of the longitudinal central line of the framework.

There are the longitudinal side sills 9, 9 which are supported on the plates 8 by the legs 10 which are spaced a suitable distance apart. There is also a central longitudinal sill 11 which is supported on the spaced legs 12, which, in turn are supported on the cross bars 7.

The sills 9, 11, form a support for the bottom of the vehicle body. As shown in Figure 3 the bottom is formed of two longitudinal side sections 13, 13 which decline from a longitudinal central line and which are supported on the respective sills on each side.

Upstanding from the ends of the bars 7, on each side of the body are the side supports 14 to which the sides 15, 15 of the body are attached. The body also has the ends 16, 16 which are secured to the front and rear supports 14.

A central tie rod 17 may be passed through the sides and bottom, with its ends secured to said sides, and equipped with a turn buckle 18 for regulating the tension thereof.

The sides 15, at their lower margins, have discharge openings, which are normally closed by the outwardly opening swinging doors 19. These doors are swung from the hinges 20 and are normally held closed by the latches 21.

When it is desired to unload the vehicle the doors may be unlatched and the load will be discharged by gravity and it is obvious that either side of the load may be discharged completely or only partially or both sides may be simultaneously discharged.

The drawing and description disclose what I now consider to be a preferred form of the invention by way of illustration only while the broad principle of the invention will be defined by the appended claim.

What I claim is:—

A vehicle body comprising side members, front and rear cross beams connecting said side members, spaced cross bars mounted on said side members, lengthwise plates spaced apart and located on opposite sides of the longitudinal central line of the frame work and secured to said cross bars, longitudinal side sills on said plates, end legs supporting said side sills, a central longitudinal sill having end legs, which are supported on said cross bars, said central sill being elevated above the side sills, a bottom formed of two longitudinal side sections which decline from a longitudinal central line and are supported on the respective sills on each side, side supports upstanding from the ends of said cross bars, upstanding sides secured to said side supports, ends for the body which are secured to the front and rear side supports, a tie rod passed through the sides and through the side sections of the bottom and whose ends are anchored to the sides, means located between and underneath said side sections for regulating the tension of said rod, said sides having discharge openings at their lower margins and outwardly opening swinging doors for opening and closing said side openings.

THADDEUS PARSONS.